United States Patent
Bhardwaj et al.

(10) Patent No.: US 12,105,658 B2
(45) Date of Patent: Oct. 1, 2024

(54) INTRA-CHIP AND INTER-CHIP DATA PROTECTION

(71) Applicant: XILINX, INC., San Jose, CA (US)

(72) Inventors: Pramod Bhardwaj, San Jose, CA (US);
Sarosh I. Azad, Fremont, CA (US);
Wern-Yan Koe, Cupertino, CA (US);
Amitava Majumdar, San Jose, CA (US)

(73) Assignee: XILINX, INC., San Jose, CA (US)

( * ) Notice: Subject to any disclaimer, the term of this patent is extended or adjusted under 35 U.S.C. 154(b) by 50 days.

(21) Appl. No.: 17/477,185

(22) Filed: Sep. 16, 2021

(65) Prior Publication Data

US 2023/0085149 A1 Mar. 16, 2023

(51) Int. Cl.
G06F 13/40 (2006.01)
G06F 13/16 (2006.01)
G06F 13/28 (2006.01)

(52) U.S. Cl.
CPC ...... *G06F 13/4027* (2013.01); *G06F 13/1668* (2013.01); *G06F 13/28* (2013.01)

(58) Field of Classification Search
None
See application file for complete search history.

(56) References Cited

U.S. PATENT DOCUMENTS

| | | | | |
|---|---|---|---|---|
| 6,968,478 B1* | 11/2005 | Edwards | ................. | G06F 11/10 714/732 |
| 8,413,018 B2* | 4/2013 | Ko | ...................... | G06F 11/1016 714/768 |
| 11,496,418 B1* | 11/2022 | Blair | ...................... | H04L 49/15 |
| 11,626,887 B1* | 4/2023 | Chandrasekher | ..... | H04L 1/0061 714/758 |
| 2016/0070934 A1* | 3/2016 | Frank | .................... | G06F 21/572 711/163 |
| 2020/0412545 A1* | 12/2020 | Liu | ....................... | H04L 9/3247 |

* cited by examiner

*Primary Examiner* — Farley Abad
*Assistant Examiner* — Dayton Lewis-Taylor
(74) *Attorney, Agent, or Firm* — Patterson + Sheridan, LLP

(57) ABSTRACT

In one example, an integrated circuit (IC) is provided that includes data circuitry and a processing circuitry. The data circuitry is configured to provide data to be transferred to a different circuitry within the IC or to an external IC. The processing circuitry is configured to: read the data provided by the data circuitry before it is transferred to the different circuitry or the external IC; calculate a first signature for the data; attach the first signature to the data; calculate, after transferring the data to the different circuitry or the external IC, a second signature for the data; extract the first signature corresponding to the data; compare the first signature to the second signature; and generate a signal based on a comparison of the first signature to the second signature.

20 Claims, 8 Drawing Sheets

INTRA-CHIP AND INTER-CHIP DATA PROTECTION

TECHNICAL FIELD

Examples of the present disclosure generally relate to integrated circuits that employ data integrity measures and ensure data integrity for data stored in or retrieved from a data store.

BACKGROUND

Integrated circuits (ICs) can be used in various data processing environments. A typical IC may handle different types of data traffic, such as data transfers between the IC and a memory separate from the IC (for example, an external memory) and data transfers between components of and within the IC. Data transferred between an IC and an external memory may correspond to data transferred by an application executed by or operating on the IC to the external memory where data regarding the application is stored. In some embodiments, such data transfers may be performed using direct memory access (DMA) or similar features. In many instances, data transfers between an IC and an external memory are several orders of magnitude larger than data transfers between components of or within an IC because the application executed by the IC may employ or utilize larger amounts of data (for example, image data and the like) and/or process the data stored in the external memory at a higher frequency and/or rate than the data transferred between components of and within the IC.

However, data transfers (both the data transfers between an IC and an external memory and the data transfers between components of and within an IC) can experience errors that result in data corruption or other data accuracy issues. In some instances, detection of such errors is critical to maintaining safety and operation of high-reliability applications. For example, in functional safety applications, data accuracy for these data transfer types is crucial. The errors and data corruption can be introduced by various causes, such as transient errors, permanent faults in logic or memory elements along the data path, and the like.

However low a probability of such errors, certain standards require that corresponding devices implement safety mechanisms to detect data corruption resulting from data transfers between source and sink points. Unfortunately, such safety mechanisms often include redundant processing and data paths, which can result in reduced performance and increased silicon area and corresponding costs. Improved data accuracy mechanisms are therefore desired.

SUMMARY

Examples described herein generally relate to integrated circuits and methods that improve both inter-IC data transfers (for example, data transfers between ICs and memory elements, such as those using direct memory access (DMA) processes and features) and intra-chip data transfers (for example, data transfers between components of an IC that are not protected by another communication protocol or the like). Thus, the techniques described herein enable data transfers with data accuracy checks incorporated as part of the data transfer process itself.

In one example, an integrated circuit (IC) is provided that includes data circuitry and a processing circuitry. The data circuitry is configured to provide data to be transferred to a different circuitry within the IC or to an external IC. The processing circuitry is configured to: read the data provided by the data circuitry before it is transferred to the different circuitry or the external IC; calculate a first signature for the data; attach the first signature to the data; calculate, after transferring the data to the different circuitry or the external IC, a second signature for the data; extract the first signature corresponding to the data; compare the first signature to the second signature; and generate a signal based on a comparison of the first signature to the second signature.

In another example, an integrated circuit (IC) is provided that includes data circuitry, a memory controller; first processing circuitry and second processing circuitry. The data circuitry is configured to read a data block from a memory circuitry. The memory controller is configured to receive the data block from the memory circuitry. The first processing circuitry is configured to: identify a read command to read the data block from the memory circuitry; calculate a first signature for the data block received from the memory circuitry; and attach the first signature to an end of the data block. The second processing circuitry is configured to: identify the data block read from the memory circuit at an input to the data circuitry; calculate a second signature for the data block at the input to the data circuitry; extract the first signature attached to the end of the data block; compare the first signature to the second signature; and generate a signal based on a comparison of the first signature to the second signature. The first processing circuitry is configure to calculate the first signature before the data block read from the memory circuitry is processed by other circuitry of the integrated circuit after being received by the memory circuitry. The second processing circuitry is configured to identify the data block at a last block before the data block is received by the data circuitry.

In yet another example, a method is provided that includes reading data provided for storage in a memory circuitry; calculating a first signature for the data; attaching the first signature to an end of the data; identifying a write command to write the data to the memory circuitry; calculating a second signature for the data; extracting the first signature attached to the end of the data; comparing the first signature to the second signature; and generating a signal based on a comparison of the first signature to the second signature.

These and other aspects may be understood with reference to the following detailed description.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
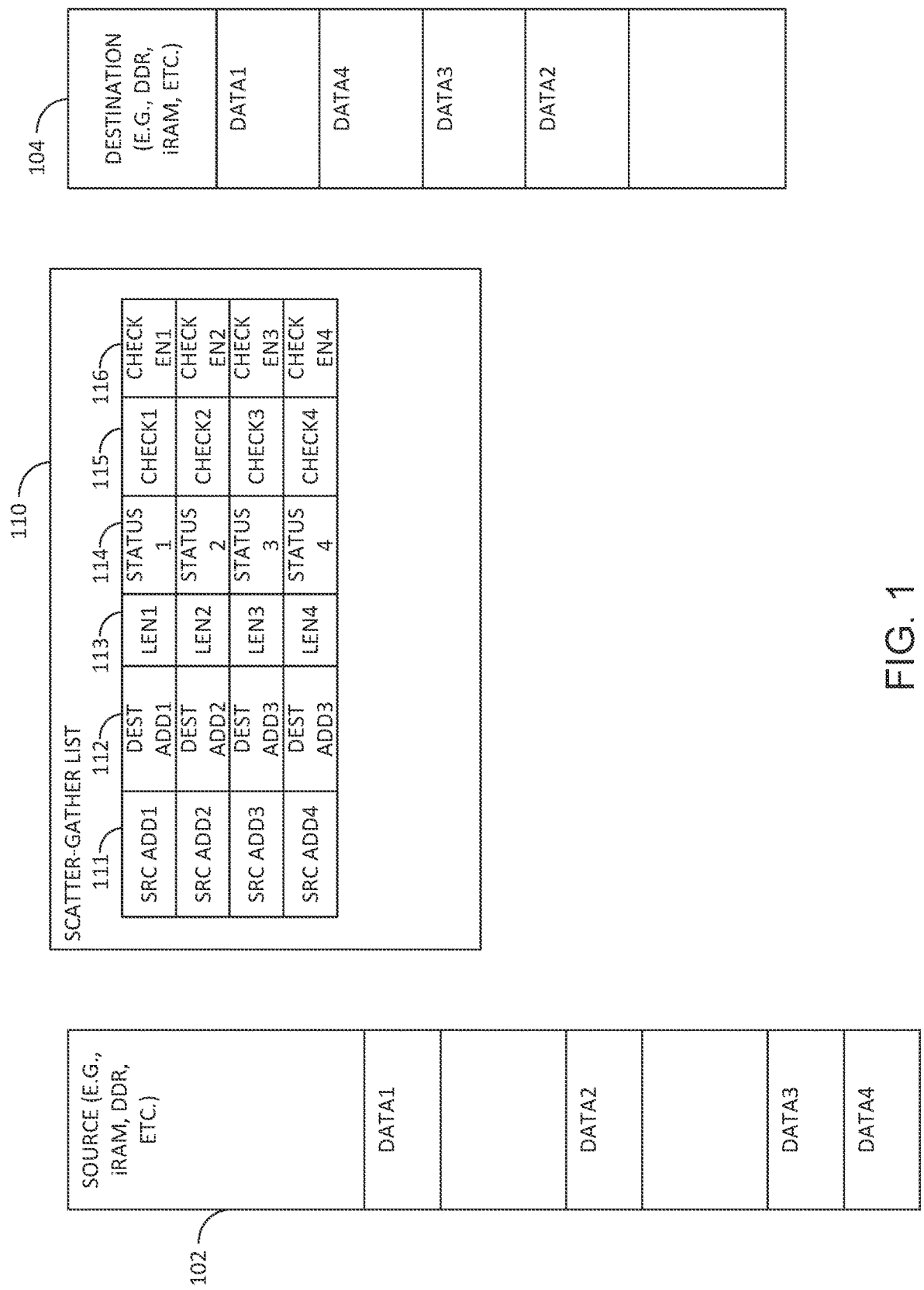
FIG. 1 shows a relationship between a scatter-gather list and source and destination memory circuitries, respectively, for use in inter-integrated circuit (IC) data transfers, in accordance with an example embodiment.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the claimed invention or as a limitation on the scope of the claimed invention. In addition, an illustrated example need not have all the aspects or advantages shown. An aspect or an advantage described in conjunction with a particular example is not necessarily limited to that example and can be practiced in any other examples even if not so illustrated or if not so explicitly described. Further, methods described herein may be described in a particular order of operations, but other methods according to other examples may be implemented in various other orders (e.g., including different serial or parallel performance of various operations) with more or fewer operations.

In the description that follows, various signals (e.g., voltages and/or currents) are described in the context of the operation of various circuits. A described signal indicates a corresponding node on which the signal is applied or propagated and further indicates nodes that are communicatively coupled and/or electrically connected. For example, description of a signal output from a first circuit and input to a second circuit indicates an output node of the first circuit (on which the signal is output from the first circuit) is communicatively coupled and/or electrically connected to an input node of the second circuit (on which the signal is input to the second circuit). Explicit description of such nodes may be omitted in the following description, but a person having ordinary skill in the art will readily understand the presence of the nodes.

Integrated circuits (ICs) can be used in various applications or situations, some of which may be safety and/or data critical situations, such as in one or more of the automotive, industrial, aerospace, defense, or similar industries. The ICs, which may provide data processing and transfer capabilities, handle various types of data traffic. A first type of data traffic includes data traffic between components of an IC and one or more external devices. In some embodiments, examples of the first type of data traffic include data received from sensors or input/output devices, executable code for a software application, or the like, and stored in an external memory or buffer via, for example, direct memory access features or similar strategies. A second type of data traffic includes data traffic related to transfers between components of an IC. The second type of data traffic may be more or less prevalent than the first type of data traffic.

For use cases in the industries introduced above, accuracy of the data transfers may be paramount and crucial for corresponding operations. Because these industries may often involve safety critical uses, data accuracy in the different types of data traffic is necessary. Faults in data can be introduced by transient errors, permanent faults in logic or memory elements along the data path, and the like. Certain ICs employ various mechanisms, such as redundant logic and data paths and the like, to reduce these faults. However, such mechanisms can impact performance (for example, due to time and resources required to perform processing for the redundant logic and data paths) and consume area of the ICs.

One way to improve data integrity and accuracy for data transfers between locations without redundancy is to verify that data received at a destination is the same as data transferred from a source. Such verification can be performed using signature, hash, or similar data check values. For example, a source value can be generated using a function applied to the data at a source. The same function can be applied to the data at a destination to generate a destination value. If the source value and the destination value are equal, then the data was accurately transferred. If the values are different, then there may be an issue with the accuracy of the data transferred. As such, a determination regarding an accuracy of the data transfer can be quickly identified.

The systems, methods, and apparatuses described herein provide techniques for detecting errors introduced in a data path between components of an IC or between one or more components of the IC and an external memory using signature or hash values and without introducing or using redundant logic or data paths. In some embodiments, the techniques described herein employ signature checks (or similar processing) to verify whether data is transferred between components of an IC or between a component of the IC and an external memory element without error, without introducing additional components for a redundant path in the data transfer. The techniques provided herein can achieve very high diagnostic coverage, as high as 99%+, which may be required by one or more applicable standards, such as Automotive Safety Integrity Level (ASIL) D standards used in autonomous vehicle systems.

Specifically, the techniques described herein improve both inter-IC data transfers (for example, data transfers between ICs and memory elements, such as those using direct memory access (DMA) processes and features) and intra-chip data transfers (for example, data transfers between components of an IC that are not protected by another communication protocol or the like). Thus, the techniques described herein enable data transfers with data accuracy checks incorporated as part of the data transfer process itself. Further details are provided below with respect to FIGS. 1-4.

FIG. 1 shows a relationship between a scatter-gather list 110 and source and destination memory circuitries 102 and 104, respectively, for use in inter-IC data transfers, in accordance with an example embodiment. The scatter-gather list 110, which is an example of a resource used to enable and execute the DMA data transfers between an IC and an external memory, is shown including various fields associated with each data transfer. While not shown here, other data transfer methods or processes (besides DMA) can be used to transfer data between source and destination memory circuitries 102 and 104, respectively.

The source memory circuitry 102 represents one side of the data transfer. For example, for a data write, the source memory circuitry 102 represents an external memory. For a data read, the source memory circuitry represents, for example, an internal random access memory (iRAM). The external memory may comprise a double data rate (DDR) memory. Similarly, the destination memory circuitry 104 represents another of the external memory, the iRAM, or the like, for corresponding data transactions. Each row in the scatter-gather list 110 may correspond to a different data block to be transferred between the source and destination memory circuitries 102 and 104, respectively. The scatter-gather list 110 includes, for each data transfer, a source address field 111, a destination address field 112, a length field 113 for a length of the data to be transferred, a status field 114 of the data transfer, a signature check field 115, and a check enable field 116. The data transfer itself will occur according to the DMA process. A DMA controller may use the scatter-gather list 110 to execute the data transfer identified in each row of the scatter-gather list 110.

The source address field 111 may identify a source location and component from which the data for the corresponding data transfer is obtained, while the destination address field 112 may identify a destination location and component to which the data is transferred. The length field 113 identifies a length of the data (for example, a data block) to be transferred between the source and destination addresses, while the status field 114 indicates whether the data transfer is in process, completed, ready to begin, and so forth. The signature check field 115 includes a hash, signature, or similar check value (for example, a cyclic redundancy check (CRC) value) that can be used to identify a data accuracy of the data transferred when the transfer is complete, where the check enable field 116 indicates whether such a check is enabled or disabled. In some embodiments, the signature check field 115 is populated with a value of 0.

The source memory circuitry 102 includes a representation of four data blocks (DATA1, DATA2, DATA3, DATA4) to be transferred to respective locations in the destination memory circuitry 104 via the DMA (or similar) process described above and according to the scatter-gather list 110. The destination memory circuitry 104 includes a representation for the data blocks (DATA1, DATA2, DATA3, and DATA4) written to the respective locations via the DMA process described above and according to the scatter-gather list 110 from the source memory circuitry 102. In some embodiments, a DMA controller (such as one of the DMA controllers described below with reference to FIGS. 3 and 4) executes the data transfers according to the scatter-gather list 110 in the DMA process or feature. Accordingly, the DMA controller may employ the scatter-gather list to enable the DMA data transfer based on the scatter-gather list 110.

When generating the scatter-gather list 110, the DMA controller may calculate the signature check value in the signature check field 115 for each data transfer identified in the scatter-gather list 110. Thus, the DMA controller calculates the signature check values CHECK1, CHECK2, CHECK3, and CHECK4 and stores them in the signature check field 115 for the four data transfers shown based on applying a corresponding hash (or similar) function to the DATA1, DATA2, DATA3, and DATA4, respectively, before the transfer begins or while the transfer occurs. Additionally, the DMA controller may enable verification of the data transfers using CHECK EN1, CHECK EN2, CHECK EN3, and CHECK EN4 bits in the check enable field 116. Once the data transfer is completed, the DMA controller may acknowledge completion of the data transfer according to the scatter-gather list 110 via the status field 114. In some embodiments, a corresponding DMA controller may calculate a corresponding hash value at the source memory circuitry 102 and hash values for the corresponding DATA1, DATA2, DATA3, and DATA4 at the destination memory circuitry 104. Based on comparing these destination hash values to the signature check values in the signature check field 115, the DMA controllers can determine whether the data transfers were accurate. Thus, the DMA controllers can provide for detection of data corruption similarly, when data is read out, or support of data accuracy during data transfers. Where the destination hash values and the signature check values are different, the DMA controller may discard the transferred data and retransfer the corresponding data block. Thus, the signature check field 115 and the check enable field 116, when integrated with the scatter-gather list 110, may enable use of the scatter-gather list 110 and the DMA controller to employ data verification techniques in DMA data transfer processes. In some embodiments, one or more other processing circuitries can perform such hash value calculations and comparisons instead of or as the DMA controller.

In some embodiments, when the data transfer is completed, the DMA controller may check to see if the signature check field 115 is populated with a zero value or a non-zero value. If the field is populated with a zero value, the DMA controller may populate the signature check field 115 with the calculated value for downstream or future use.

In some embodiments, the DMA controller is enhanced to provide the CRC value for use to protect data accuracies and movements. In some embodiments, the DMA controller may calculate the CRC value when data from a read transaction is moved to a write channel. In some embodiments, the DMA controller may calculate the CRC value for data within a channel. In some embodiments, the DMA controller may support DMA data transfers across multiple data. In some embodiments, the CRC value may cover the data being transferred. In some embodiments, the signature check field 115 is populated with the CRC, or the scatter-gather list 110 further comprises a CRC field, configured to store a CRC value that covers the data block being transferred. In some embodiments, the check enable field 116 is populated with a CRC enable value, or the scatter-gather list 110 further comprises a CRC enable field comprising the CRC enable value, which indicates when to compare the CRC value in the CRC field (or the signature check field 115) to a calculated CRC value generated based on the data block being transferred.

For the intra-chip data transfers, the accuracy of data transferred can be verified based on signatures or hash values attached to the data. For example, when a component of an IC or the IC generates data for storage in, for example, a memory element, the data may first be transferred through other components of the IC. For example, a processing circuitry may generate data to store in memory and transfer that data to a memory controller to store in the memory. Because such a transfer within the IC can create inaccuracies in the data, it may be desirable to verify these intra-IC transfers with respect to data accuracy. As such, a processing circuitry within the IC can generate a signature (such as a hash value) for the generated data. The generated signature can then be attached to the generated data, for example, at the end of the generated data. The signature can also be stored in the memory element with the generate data. In some embodiments, the signature can be generated based on applying a function to the generated data. Further details are provided below with reference to FIGS. 2-4.

Figure 2:
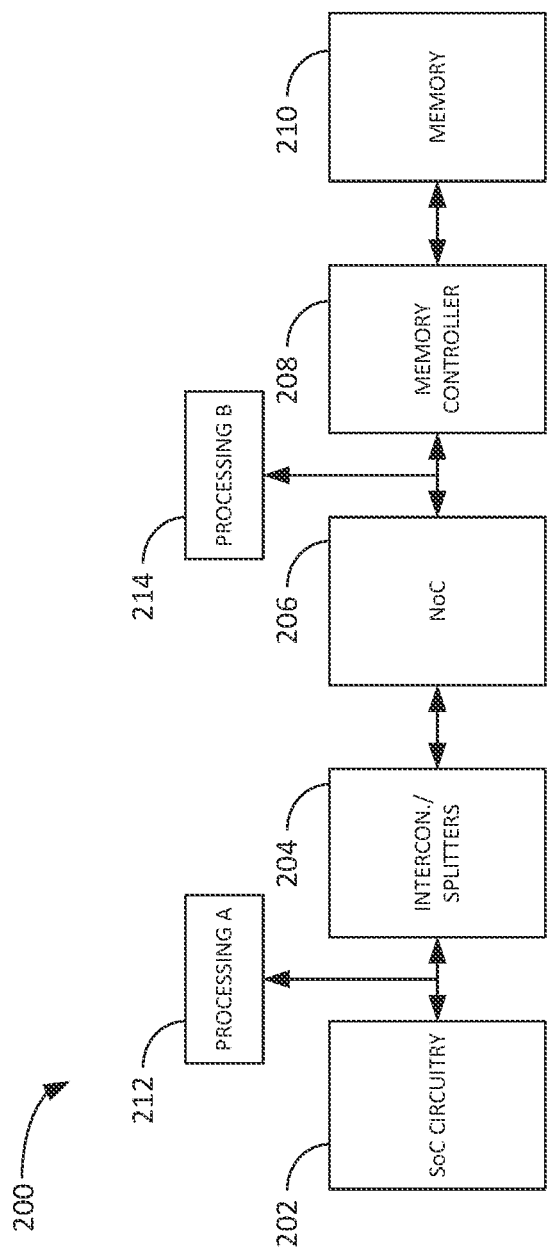
FIG. 2 shows a block diagram of components of an IC that implements a signature to verify accuracy of intra-IC or intra-chip transferred data, in accordance with an example embodiment.

FIG. 2 shows a block diagram of components of an integrated circuit (IC) 200 that implements signature verification of an accuracy of intra-IC transferred data, in accordance with an example embodiment. The IC 200 comprises a system on a chip (SoC) circuitry 202 that is a circuitry that generates or provides data for storage in a memory 210, such as an external memory. In some embodiments, the data may be provided to the memory circuitry as a data transaction. As introduced above, the data generated by the SoC circuitry 202 may be handled by or pass through a number of other components of the IC 200. These other components may enable the routing and conveyance of the data internal to the IC 200 to a memory controller 208 that transfers the data to the memory 210. These other components between the SoC circuitry 202 and the memory controller 208 include interconnects/splitters 204 and a network-on-chip (NoC) 206. The interconnects/splitters 204 may correspond to the components of the IC 200 that enable transfer of the data to the NoC 206. The interconnects/splitters 204 may provide a physical link between the SoC circuitry 202 with the NoC 206, which enables the components of the SoC circuitry 202 to connect via a network-based communications subsystem. The NoC 206 may further enable the transfer of the data to the memory controller 208. The memory controller 208 may control where and how the data is stored in the memory 210. In some embodiments, the memory controller 208 may employ the storage of the data according to the DMA process in the memory 210 based on, for example, a scatter-gather list, such as the scatter-gather list 110 of FIG. 1.

In the IC 200, connections between the SoC circuitry 202, the interconnects/splitters 204, the NoC 206, the memory controller 208, and the memory 210 represent a safety critical data flow, where the corresponding blocks are safety critical blocks. Such safety critical data flows and blocks employ fault mitigation that does not involve redundant paths or blocks and that instead utilize a signature value for the data to achieve the fault mitigation. In some embodiments, the signature value of the data generated by the SoC circuitry 202 is generated by a processing block A 212, which may be implemented by a processing circuitry of the IC 200.

For the intra-chip data transfers, the accuracy of the transferred data may be verified after each write and read transaction to ensure that the data is accurate regardless of the operation. In some embodiments, the data transferred intra-chip may correspond to data received via inter-chip communications because the memory 210 may correspond to an external memory.

For example, for write transactions, where the SoC circuitry 202 writes the data to the memory 210, the processing block A 212 may snoop or read every data transaction generated by the SoC circuitry 202 and calculate a signature for the data. The signature can be calculated based on a hash or similar function applied to the data. The processing block A 212 can attach or append the signature, for example, at an end of the data being transferred. In some embodiments, the processing block A 212 calculates the signature per block of the data coming out of the SoC circuitry 202 or other component of the IC 200 that initiates the data transfer. The processing block A 212 may be located close to or at an output of the SoC circuitry 202 or other component that initiates the data transfer. For example, the processing block A 212 may be located after the SoC circuitry 202 but before any other component of the IC 200 handles the data from the SoC circuitry 202.

A processing block B 214 may be configured to snoop the data transaction to detect the SoC circuitry 202 writing the data to the memory 210. Upon identifying one such write of the data to the memory 210, the processing block B, which is located near or at an input of the memory controller 208, calculates a second signature of the data received from the SoC circuitry 202 via the interconnects/splitters 204 and the NoC 206 and compares this second signature with the signature attached to the data by the processing block A 212. For example, the processing block B 214 may be located after the NoC 206 and all other components of the IC 200 before the memory controller 208. In case of a mismatch between the signature and the second signature, the processing block B 214 signals an error. Where the error is signaled, the processing block B 214 may request that the data be resent. In case of a match between the signature and the second signature, the processing block B 214 signals such a match.

For the read transactions, where the SoC circuitry 202 requests to read data from the memory 210, the processing block B 214 may monitor read commands from the SoC circuitry 202 (or other initiating component) to capture a target read address for the memory 210 from where the data is being read. The processing block B 214 may receive the data from the target read address as part of the read transaction and calculate a first read signature for the received data. The processing block B 214 may generate the first read signature based on applying a signature or hash-type function to the received data. The processing block B 214 may attach or append the first read signature to the end of the data read from the target read address such that the first read signature is communicated as part of the read transaction.

Furthermore, the data read from the target read address and the first read signature are conveyed from the memory 210, through the memory controller 208, the NoC 206, and the interconnects/splitters 204, to the SoC circuitry 202. The processing block A 212, located between the SoC circuitry 202 and the interconnects/splitters 204, will snoop the read transaction for the read data and calculate a second read signature based on the read data. The processing block A 212 compares the calculated second read signature with or to the received first read signature and triggers an error if there's a mismatch or indicates that the first read signature and the second read signature are equal when there is no mismatch. When an error in the signatures is triggered, the data (or a copy of the data) may be resent from a source (for example, the SoC circuitry 202) to a destination (for example, the memory controller 208).

Figure 3:
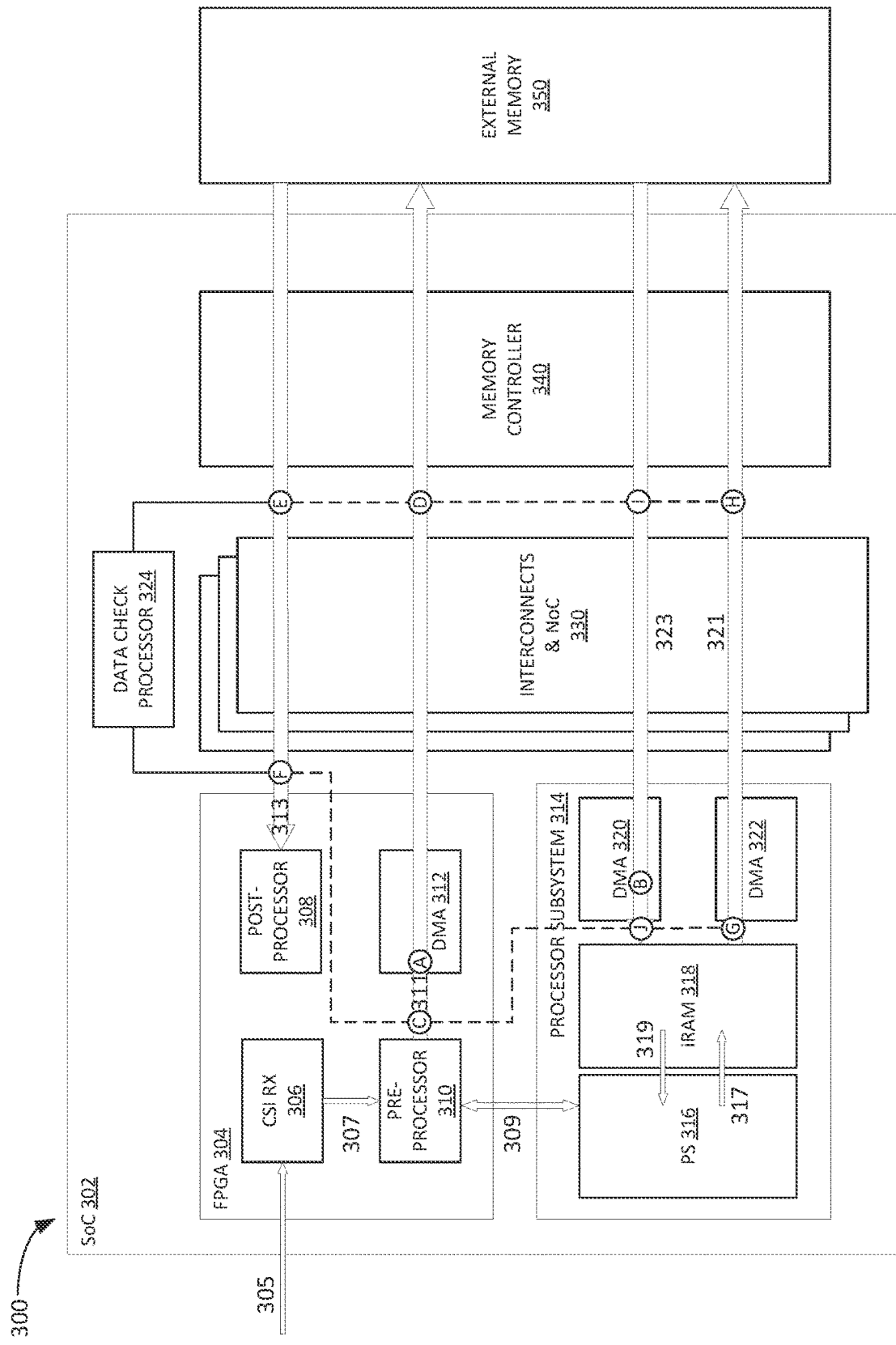
FIG. 3 shows a block diagram of an integrated circuit hardware system, in accordance with an example embodiment.
Figure 4:
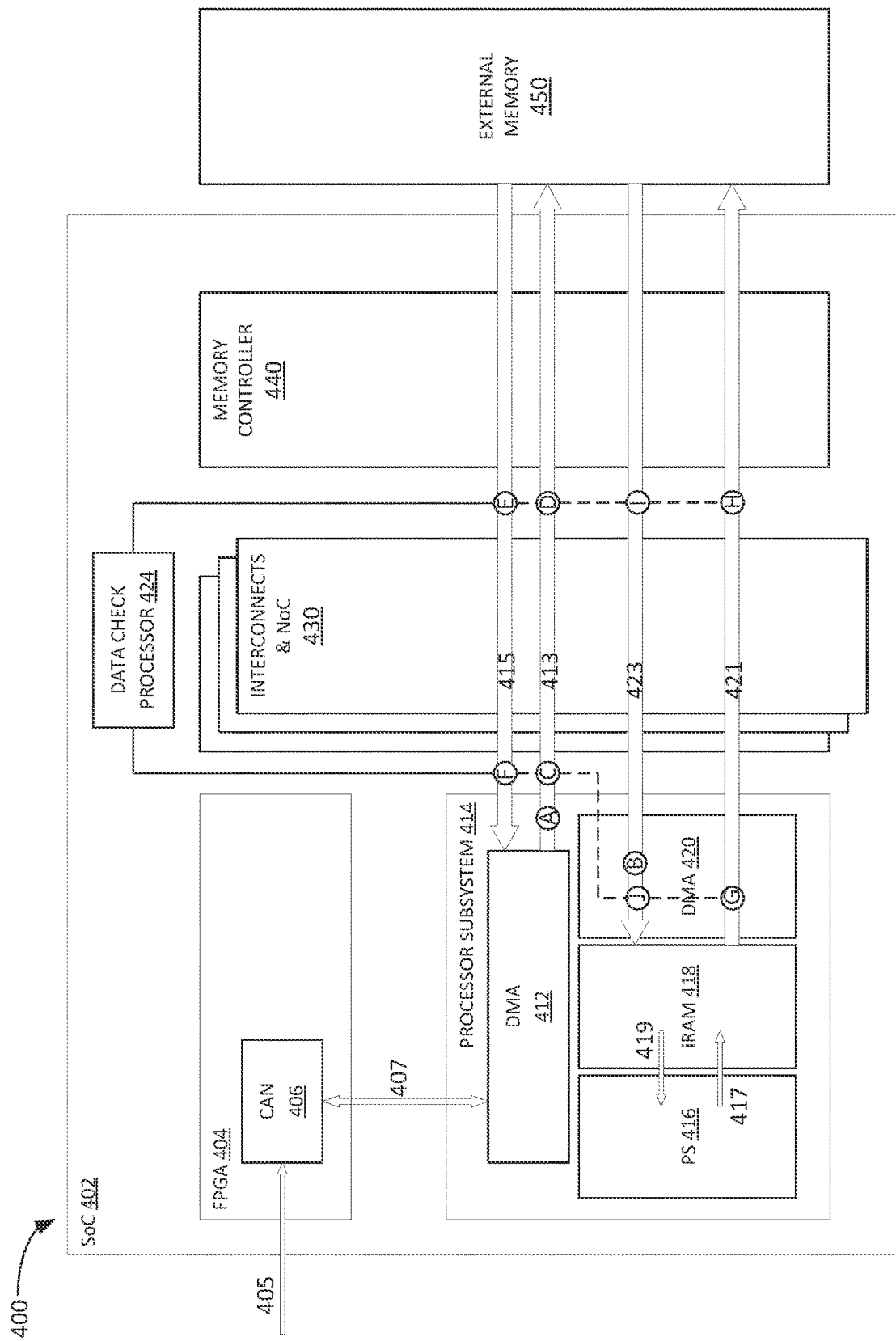
FIG. 4 shows a block diagram of a second integrated circuit hardware system, in accordance with another example embodiment.

FIGS. 3 and 4 below provide additional details regarding how the data accuracy aspects described herein reduce such errors without introducing redundant data or logic paths.

FIG. 3 shows a block diagram of an integrated circuit hardware system 300, in accordance with an example embodiment. The system 300 comprises an IC or a system on a chip (SoC) 302 having various components and an external memory circuitry or module 350. The SoC 302 comprises a field programmable gate array (FPGA) 304 (which corresponds to programmable logic (PL)), a processor subsystem 314, interconnects and network-on-chips (NoCs) 330, a memory controller 340, and a data check processor 324. In some embodiments, the data check processor 324, or the functions thereof, may be integrated into one or more of the FPGA 304, the processor subsystem 314, or a similar component. In some embodiments, one or more components of the SoC 302 may execute instructions to perform data processing on a data block, where the data block is transferred between different components of the SoC 302.

The FPGA 304 comprises various components configured to receive and process data. For example, the FPGA 304 comprises a camera serial interface receiver (CSI RX) 306 that receives data 305 from a camera sensor, or the like. The CSI RX 306 may be replaced by any other component that receives data for processing. The CSI RX 306 processes the data 305 to generate data 307 provided to a pre-processor 310 of the FPGA 304. The pre-processor 310 may pre-process the data 307 by inspecting the data 307, calculating metadata (for example, CRC/signature/checksum information), and send this metadata as data 311 to the external memory 350 and as data 309 to a processing system (PS) 316 of the processor subsystem 314.

The PS 316 may use a DMA controller 320 to extract data 323 from the external memory 350, verifying data correctness using the DMA controller 320 as described herein, and operate upon the extracted data 323. Such operation on the extracted data 323 may comprise transforming the extracted data 323 as required by an application or process and sending the transformed data back to the external memory 350 via a DMA controller 322 as data 321. In some embodiments, the post processor 308 may extract the data 321 stored in the external memory 350 by the PS 316 as data 313 and for use by or transmission to a subsequent processing stage or downstream processing device. In some embodiments, though not shown in FIG. 3, the post processor 308 may extract the data 313 from the external memory 350 via the DMA controller 312 or via an internal DMA controller. In some embodiments, the post processor 308 extracts the data 313 from the external memory 350 for processing in a subsequent stage.

In some embodiments, the PS 316 processes and/or stores the data 309 received from the pre-processor 310 in an internal memory (iRAM) 318 as data 317. The PS 316 may also read data 319 from the iRAM 318, which may correspond to data previously stored in the iRAM 318 (such as the data 317) or data accessed from the external memory 350 (such as data 323). The iRAM 318 may store data 321 in the external memory 350 via configuring a DMA controller 322 to transfer the data 321 to the external memory 350 according to a scatter-gather list using DMA. The iRAM 318 may also read the data 323 from the external memory 350 via configuring a DMA controller 320 to read the data 323 from the external memory 350 according to a corresponding scatter-gather list using DMA.

In some embodiments, one or more DMA controllers can comprise a single DMA controller. For example, the DMA controllers 320 and 322 may be implemented by two separate channels of a same DMA controller, where each channel is responsible with a particular direction of data transfer with respect to the external memory 350.

As shown in the system 300, communications (for example, corresponding to the data 311, 313, 321, and/or 323) between the FPGA 304 and/or the processor subsystem 314 of the SoC 302 with the external memory 350 go through one or more interconnects and/or NoCs (represented by the interconnects & NoC 330) and a memory controller (represented by the memory controller 340). The interconnects & NoC 330 may correspond to components, physical connections, and the like that enable data transfer between the FPGA 304 and the processor subsystem 314 and the external memory 350 and allow for data transfer therebetween, as described with respect to FIG. 2. The memory controller 340 may control access to the external memory 350 to enable proper storage and access of data in the external memory 350. Specifically, the memory controller 340 translate reads and writes from a first protocol to a protocol for the external memory 350 and drives a corresponding interface for the external memory 350 with appropriate protocol and signaling (for example, via a Joint Electron Device Engineering Council (JEDEC) compliant external memory interface). In some embodiments, a presence or absence of scatter-gather only affect the addresses that are accessed by the DMA controller, such as the DMA controller 320 and 322. The memory controller 340 may facilitate access to any and all addresses in the external memory 350, regardless of use of scatter-gather or other procedures.

In some embodiments, though not explicitly shown in FIG. 3, one or more of the interconnects & NoC 330 or the memory controller 340 may introduce errors in the data transferred between the external memory 350 and the FPGA 304 or the processor subsystem 314.

The DMA controllers 312, 320, and 322 may employ a scatter-gather list, similar to the scatter-gather list 110 of FIG. 1, to execute DMA data transfers, such as the transfer of the data 311, 313, 321, and/or 323. The DMA controllers 312, 320, and 322 may execute instructions to perform data processing on the data block being transferred between the components of the IC. Such instructions may cause the DMA controllers 312, 320, and 322 to employ the scatter-gather list, including calculating the signature check value for the data block. The DMA controllers 312, 320, and 322 may then work with the memory controller 340 to transfer the data to the external memory 350 based on the scatter-gather list. The data accuracy of the transfer can be checked by one of the DMA controllers 312, 320, and 322 by calculating the second hash value for the transferred data and compare the hash values.

For example, at point A, the DMA controller 312 may use a scatter-gather list for transfer of the data 311 from the pre-processor 310 (as a source) to the external memory 350 (as a destination). The DMA controller 312 may calculate a signature check value for the data being transferred from the data source. By calculating the signature check value at point A of the DMA controller 312, the signature check value can represent the data 311 before any error in the data transfer can occur. The signature check value is then stored as part of the scatter-gather list for the corresponding data transfer. Thus, any time that the data transfer is read out from external memory 350, for example, with the data 323 read from the external memory 350 by the iRAM 318, or when the data is stored into the external memory 350, the signature check value can be read from the scatter-gather list and compared with a signature check value calculated for the data read out from or stored in the external memory 350. When the values match, the data transferred to and/or retrieved from the external memory 350 are the same and the data accuracy is likely maintained. Where the values do not match, the data accuracy is likely not maintained. Thus, data transfer accuracies can be maintained and ensured without employing redundant components in the logic or data paths.

The verification of data accuracy when reading data from the external memory 350 occurs at point B with respect to the data 323. At point B, the DMA controller 320 can perform verification of the data accuracy of the data 323 by calculating a hash value at the DMA controller 320 for the received data (for example, by applying the same hash function applied by the DMA controller 312 at point A to the data read from the external memory 350). The DMA controller 312 can then compare the calculated hash value for the received data 323 with the signature check value stored in the scatter-gather list for the corresponding data being read from the external memory 350 to determine the data accuracy for the read data. Where the calculated hash value and the signature check value match, the DMA controller 320 determines that the read data is accurate. When the calculated hash value and the signature check values do not match, the DMA controller 320 determines that the read data may be inaccurate.

The SoC 302 also provides data accuracy verification of data transfers that are internal to the SoC 302. For example, the data check processor 324 can perform verification of the data accuracy of data transfers within the SoC 302 at points for each of the data 311, 313, 321, and 323. For example, when the data 311 is received from the pre-processor 310 for storage in the external memory 350, the data check processor 324 accesses such a write command at point C and calculates a signature value for the data 311 based on a signature, or similar, function. The data check processor 324 may attach the signature value to the data 311. At point D, the data check processor 324 may calculate a second signature value for the data 311 and then compare the calculated second signature value to the signature value attached to the data 311. Where the signature values are the same, the data 311 is accurate between the pre-processor 310 and the memory controller 340. Where the signature values are not the same, the data 311 is not accurate between the pre-processor 310 and the memory controller 340, and the data check processor 324 can request the data 311 be discarded and resent from the pre-processor 310.

The data check processor 324 may similarly verify an accuracy of the data 313 read by the post-processor 308 from the external memory 350 by calculating the signature value at point E for the data 313 read from the external memory 350 and attaching the calculated signature to the data 313. The data check processor 324 then calculates the second signature value at point F and compares the signature value attached to the data 313 to the second signature value to determine when the data 313 is accurate (when the signature values are the same) or inaccurate (when the signature values are not the same).

The data check processor 324 also verifies the accuracy of the data 321 written by the iRAM 318 to the external memory 350 by calculating the signature value at point G for the data 321 received from the iRAM 318 and attaching the calculated signature to the data 321. The data check processor 324 then calculates the second signature value at point H and compares the signature value attached to the data 321 to the second signature value to determine when the data 321 is accurate (when the signature values are the same) or inaccurate (when the signature values are not the same).

Furthermore, the data check processor 324 verifies the accuracy of the data 323 read by the iRAM 318 from the external memory 350 by calculating the signature value at point I for the data 323 and attaching the calculated signature to the data 323. The data check processor 324 then calculates the second signature value at point J and compares the signature value attached to the data 323 to the second signature value to determine when the data 323 is accurate (when the signature values are the same) or inaccurate (when the signature values are not the same).

For any of these accuracy checks, when the data is inaccurate, the data check processor 324 can discard the corresponding data and request that the read or write transaction be repeated, repeating the corresponding accuracy check(s), until the transaction is completed with accurate data.

As an example use case, the IC 200 may execute a program or application that receives the data 305 that is preprocessed via the pre-processor 310. The processed data 311 may be transferred by the DMA controller 312. Where the data is video or image data, the data may be transferred on a line-by-line basis. In some embodiments, the program configures the DMA controller 312 to populate the signature check field in the scatter-gather table for the data 311 with a zero value or a hash value calculated based on the data 311. When the application is ready to further process the data 311, it initiates the second transfer (for example, the read of the data 323 at point B). The hash value for the data 323 in the has check field for the data 323 may be the same as the calculated signature check value for the data 311, even if address or other field values are changed, while obtaining the data 323 into the iRAM 318. The DMA controller 320 calculates the signature check value for the data 323 while transferring the data 323 and compares with the calculated signature check value at point B with the signature check value stored in the scatter-gather list for the data 323. The DMA controller 320 flags an error if there is a mismatch.

FIG. 4 shows a block diagram of a second integrated circuit hardware system 400, in accordance with another example embodiment. One or more components of the system 300 of FIG. 3 correspond to similarly named and numbered components of the system 400 of FIG. 4. As such, the similarly named and numbered components between the system 300 and the system 400 may have common structure and/or functionality that is not repeated here for brevity.

The system 400 comprises an IC or a system on a chip (SoC) 402 and an external memory circuitry or module 450. The SoC 402 comprises an FPGA 404 (which corresponds to programmable logic (PL)), a processor subsystem 414, interconnects and network-on-chips (NoCs) 430, a memory controller 440, and a data check processor 424. The FPGA 404 comprises a controller area network (CAN) circuit 406 that receives data 405 from, for example, a vehicle sensor, or the like. The CAN circuit 406 processes the data 405 to generate data 407 provided to a DMA controller 412 of the processor subsystem 414.

In some embodiments, the DMA controller 412 may store data 413 in the external memory 450 and read data 415 from the external memory 450 according to respective scatter-gather (or similar) lists and DMA. The PS 416 may process and/or store data 417 in an iRAM 418. The PS 416 may also read data 419 from the iRAM 418. The iRAM 418 may store data 421 in the external memory 450 via configuring a DMA controller 420 to transfer the data 421 to the external memory 450. The DMA controller 420 may also read data 423 from the external memory 450. As shown in the system 400, communications (such as related to the data 413, 415, 421, and 423) between the FPGA 404 or the processor subsystem 414 of the SoC 402 and the external memory 450 go through one or more interconnects and/or NoCs 430 and a memory controller 440).

The DMA controllers 412 and 420 may employ a scatter-gather list, similar to the scatter-gather list 110 of FIG. 1, to execute DMA data transfers, such as the transfer of the data 413, 415, 421, and/or 423. For example, at point A, the DMA controller 412 may use a scatter-gather list for to transfer the data 413 from the processor subsystem 414 (as a data source) to the external memory 450 (as a data destination). The DMA controller 412 may calculate a signature check value for the data being transferred from the source. By calculating the signature check value at point A of the DMA controller 412, the signature check value can represent the data 413 before any error in the data transfer can occur. The signature check value is then stored as part of the scatter-gather list for the corresponding data transfer. Based on this stored signature check value, any time that the data transfer is read out from external memory 450, for example, with the data 415 or 423 read from the external memory 450, the signature check value can be read from the scatter-gather list and compared with a signature check value calculated for the data read out from the external memory 450. When the values match, the data transferred to and retrieved from the external memory 450 are the same and the data accuracy is likely maintained. Where the values do not match, the data accuracy is likely not maintained. Thus, data transfer accuracies can be maintained and ensured without employing redundant components in the logic or data paths.

An example of verifying data accuracy when reading data from the external memory 450 occurs at point B with respect to the data 421. At point B, the DMA controller 420 can perform verification of the data accuracy of the data 423 by calculating a received hash value at the DMA controller 420 for the received data (for example, by applying the same hash function applied by the DMA controller 412 at point A to the data read from the external memory 450). The DMA controller 412 can then compare the calculated received hash value for the data 423 with the signature check value stored in the scatter-gather list for the corresponding data being read from the external memory 450 to determine the data accuracy for the read data. Where the calculated received hash value and the signature check values match, the DMA controller 420 determines that the read data is accurate. When the calculated hash value and the signature check values do not match, the DMA controller 420 determines that the read data may be inaccurate.

The SoC 402 also provides data accuracy verification of data transfers that are internal to the SoC 402. For example, the data check processor 424 can perform verification of the data accuracy of data transfers within the SoC 402 at points for each of the data 413, 415, 421, and 423. For example, the data check processor 424 uses points C and D to verify accuracy of the transfer of the data 413, points E and F to verify accuracy of the transfer of the data 415, points G and H to verify the accuracy of the transfer of the data 421, and points I and J to verify the accuracy of the transfer of the data 423.

For any of these accuracy checks, when the data is inaccurate, the data check processor 424 can discard the corresponding data and request that the read or write transaction be repeated, repeating the corresponding accuracy check(s), until the transaction is completed with accurate data.

As explained above, in the examples of the system 300 and the system 400, certain data transfers have inherent data accuracy protections. For example, data transfers of the system 300 related to the receipt of the data 305 by the CSI RX 306 may occur using a CSI protocol that supports packet level data protection for any data transfers between the CSI RX 306 and a corresponding sensor. Similarly, the data 307 between the CSI RX 306 and the pre-processor 310 may similarly occur using the CSI protocol or another protocol that provides data protection for the data 307. However, one or more communications that occur between components of the SoC 302 (such as the data 309 communicated between the pre-processor 310 of the FPGA 304 and the PS 316 of the processor subsystem 315 and the data 317 and/or data 319 communicated between the PS 316 and the iRAM 318) may occur using one or more protocols that protects data accuracy in communicated data. As such, these communications, and the corresponding data, have inherent protections against errors in the data. In the system 400, the data 405 received by the CAN circuit 406 and the data 407, 417, and 419, being transferred between components of or within the SoC 402 may have inherent protections against data errors.

However, the data transfers between the SoC 302 and the external memory 350 or the SoC 402 and the external memory 450, which occur via one of the DMA controllers 312, 320, or 322 of FIG. 3 or the DMA controllers 412 or 420 of FIG. 4 may generally be unprotected with respect to data accuracy. Where the intervening blocks (such as the interconnects & NoCs 330 and 430 or the memory controller 340 or 440) do not employ redundant logic and/or data paths, these data transfers via the DMA controllers between the SoC and the external memory may result in errors in the transferred data that potentially lead to erroneous system behavior and/or failure of a safety function. Instead, the aspects described herein provide mechanisms for verifying data accuracy for data transfers between the SoC 302 and external memory 350 or the SoC 402 and the external memory 450 and/or between components of the SoC 302 and the SoC 402.

Figure 5:
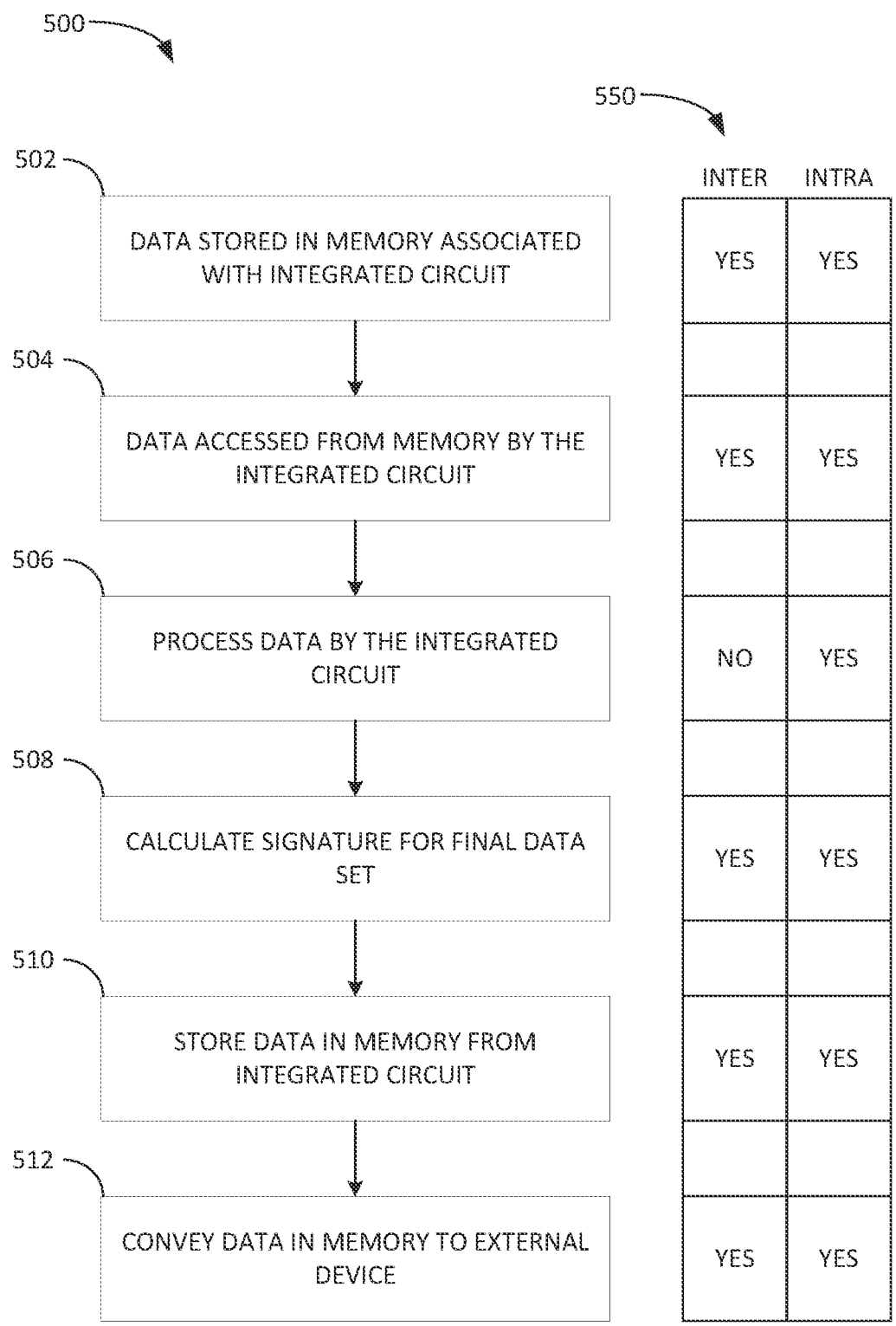
FIG. 5 depicts a flowchart of a method of handling data by the IC hardware circuits of FIGS. 3 and 4, in accordance with an example embodiment.

FIG. 5 depicts a flowchart of a method 500 of handling data by the IC hardware circuits, such as the IC hardware systems 300 and 400 of FIGS. 3 and 4, respectively, in accordance with an example embodiment. The flowchart includes blocks representing the method 500 and further includes details 550 regarding whether the corresponding blocks can employ data accuracy mechanisms as described herein, specifically the inter-IC mechanism and/or the intra-IC mechanism. Thus, for each block of the method 500, the details 550 identify whether the block involves an inter-chip data accuracy mechanism, as introduced with respect to FIG. 1, and/or an intra-chip data accuracy mechanism, as introduced with respect to FIG. 2.

The method 500 begins with block 502, relating to storing data in a memory associated with an IC. In some embodiments, this corresponds to receiving data from a sensor, such as a camera sensor, a speed sensor, or other environmental sensor, and storing this data in a memory circuitry, such as the external memory 350 or 450 of FIGS. 3 and 4, respectively. In some embodiments, the data is received via an IC, such as the SoC 302 or SoC 402 of FIGS. 3 and 4, before being stored in the memory circuitry. Because this block involves data handled by the IC and transferred for storage in the memory circuitry (i.e., involves a data transfer between ICs), accuracy of the data transferred can be protected by an inter-IC data accuracy mechanism, such as described above with reference to FIG. 1. Furthermore, because the IC includes various components, this block also involves transferring the data between components of the IC, such that accuracy of the intra-IC data transfer can be protected by an intra-IC data accuracy mechanism, described above with reference to FIG. 2. In some embodiments, where the IC is not involved with storing the data (for example, the sensor stores the data directly in the memory circuitry without involving the IC), then the intra-IC data accuracy mechanisms may not be utilized.

The method 500 continues with block 504, relating to accessing data from the memory by the IC. Such accessing of the data involves an inter-IC transfer (transfer of the data from the memory circuitry by the IC) and an intra-IC transfer (transfer of the data between components of the IC). The data accuracy of the inter-IC data transfer may be protected by the inter-IC data accuracy mechanisms, while the data accuracy of the intra-IC data transfer may be protected by the intra-IC data accuracy mechanisms.

The method 500 further includes block 506, relating to processing the data by the IC. Such processing of the data may involve one or more intra-IC transfers, where data is transferred between components of the IC to perform the processing and/or local storage of the data. The data accuracy of the one or more intra-IC data transfers may be protected by the intra-IC data accuracy mechanisms. The data involved in the intra-IC transfer may further comprise code for such processing (for example, algorithms, operating system, and the like) stored in a memory, variables, stack, heap paged out to the memory, virtual memory address translation tables, and the like.

The method 500 includes block 508, relating to calculating a signature for a final data set processed by the IC. Such final processing and/or calculation may involve an inter-IC transfer (for calculation of the signature for use in inter-IC transfers) and an intra-IC transfer (to perform the actual calculation). The data accuracy of the inter-IC data transfer may be protected by the inter-IC data accuracy mechanisms, while the data accuracy of the intra-IC data transfer may be protected by the intra-IC data accuracy mechanisms.

The method 500 further continues with block 510, relating to storing the final data set in the memory circuitry by the IC. This block of storing the final data set involves an inter-IC transfer between the IC and the memory circuitry and an intra-IC transfer between the components of the IC. The data accuracy of the inter-IC data transfer may be protected by the inter-IC data accuracy mechanisms, while the data accuracy of the intra-IC data transfer may be protected by the intra-IC data accuracy mechanisms.

The method 500 additionally continues with block 512, relating to conveying the data stored in the memory circuitry, such as the final data set, to an external device. This block may involve an inter-IC transfer between the IC and the memory circuitry and an intra-IC transfer between the components of the IC where the IC is involved with the conveyance of the data to the external device. The data accuracy of the inter-IC data transfer may be protected by the inter-IC data accuracy mechanisms, while the data accuracy of the intra-IC data transfer may be protected by the intra-IC data accuracy mechanisms. However, where the IC is not involved with the conveyance of the data to the external device, neither inter-IC nor intra-IC data accuracy mechanisms are utilized.

Thus, one or more blocks involving the inter- or intra-IC accuracy mechanisms described herein provide for improved data accuracies in corresponding data transfers.

Figure 6A:
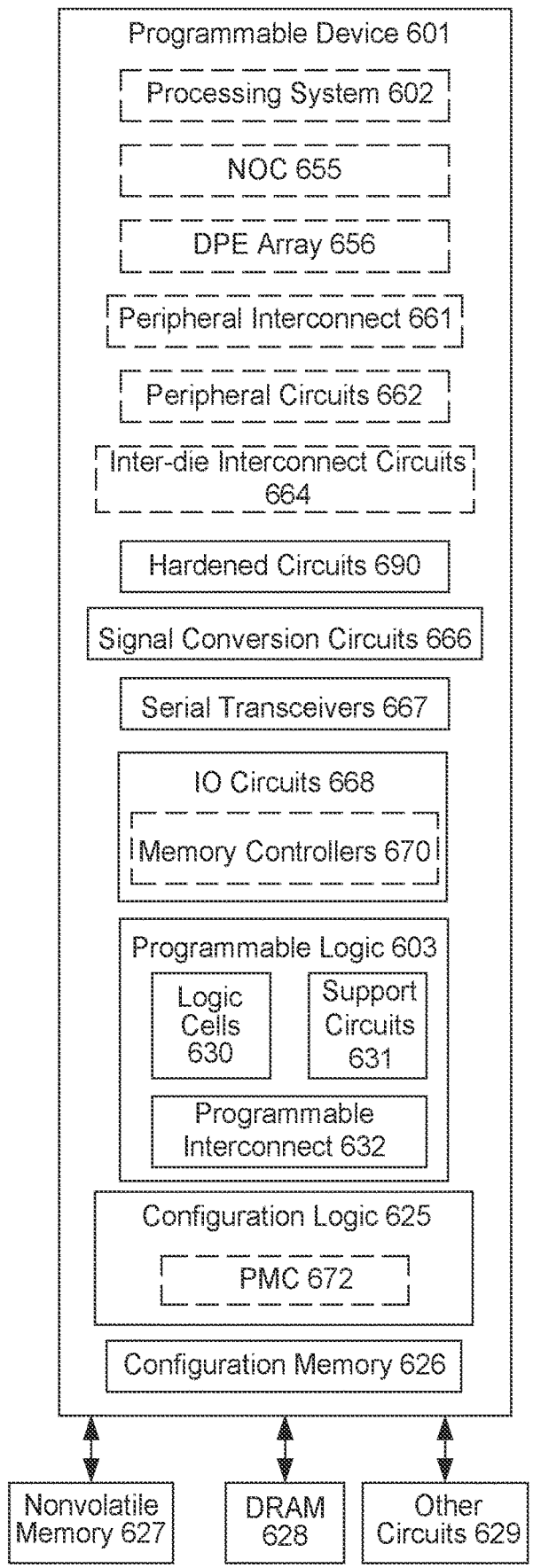
FIG. 6A is a block diagram depicting a programmable IC according to an example.

FIG. 6A is a block diagram depicting a programmable device 601 according to an example. The programmable device 601 includes programmable logic (PL) 603 (also referred to as a programmable fabric), input/output (IO) circuitries 668, serial transceivers 667, signal conversion circuitries 666, hardened circuitries 690, configuration logic 625, and configuration memory 626. The programmable device 601 can be coupled to external circuitries, such as nonvolatile memory 627, dynamic random access memory (DRAM) 628, and other circuitries 629. In various examples, the programmable device 601 further includes a processing system (PS) 602, a network-on-chip (NOC) 655, a data processing engine (DPE) array 656, peripheral interconnect 661, peripheral circuitries 662, and inter-die interconnect circuitries 664.

The PL 603 includes logic cells 630, support circuitries 631, and programmable interconnect 632. The logic cells 630 include circuitries that can be configured to implement general logic functions of a plurality of inputs. The support circuitries 631 include dedicated circuitries, such as digital signal processors, memories, and the like. The logic cells 630 and the support circuitries 631 can be interconnected using the programmable interconnect 632. Information for programming the logic cells 630, for setting parameters of the support circuitries 631, and for programming the programmable interconnect 632 is stored in the configuration memory 626 by the configuration logic 625. The configuration logic 625 can obtain the configuration data from the nonvolatile memory 627 or any other source (e.g., the DRAM 628 or from the other circuitries 629). In some examples, the configuration logic 625 includes a platform management controller (PMC) 672. The PMC 672 is configured to boot and configure the subsystems of the programmable device 601, such as the PL 603, the PS 602, the NoC 655, the DPE array 656, the signal conversion circuitries 666, the hardened circuitries 690, and the like.

The IO circuitries 668 provide an external interface for the subsystems of the programmable device 601, such as the PL 603, the PS 602, and the like. In some examples, the IO circuitries 668 include memory controllers 670 configured to interface external memories (e.g., the DRAM 628). Other connectivity circuitries can include the peripheral interconnect 661, the peripheral circuitries 662, and the inter-die interconnect circuitries 664. The peripheral interconnect 661 includes bus interface circuitries, such as peripheral component interconnect express (PCIe) circuitries and the like. The peripheral circuitries 662 include universal serial bus (USB) ports, Ethernet ports, universal asynchronous transceiver (UART) ports, serial peripheral interface (SPI) ports, general purpose IO (GPIO) ports, serial advanced technology attachment (SATA) ports, and the like. The inter-die interconnect circuitries 664 include circuitries configured to interface like inter-die interconnect circuitries in other programmable device(s) (e.g., for when the programmable device 601 is one die in a multi-die integrated circuit package). The serial transceivers 667 include high-speed transmit/receive circuitries configured to provide an external IO interface for the programmable device 601.

The PS 602 can include microprocessor(s), memory, support circuitries, IO circuitries, and the like. The NOC 655 is configured to provide for communication between subsystems of the programmable device 601, such as between the PS 602, the PL 603, the hardened circuitries 690, and the DPE array 656. The DPE array 656 can include an array of DPE's configured to perform data processing, such as an array of vector processors. The signal conversion circuitries 666 include analog-to-digital converters (ADCs) and digital-to-analog converters (DACs).

The hardened circuitries 690 comprise circuitries with predetermined functionality. A given hardened circuitry 690 can include one or more predetermined functions. Example hardened circuitries 690 include filters, mixers, sample-rate converters, transforms circuitries, and the like. A hardened circuitry 690 can be programmable to configure specific predetermined functionalities or select among predetermined functionalities. However, in contrast to a circuitry in the PL 603, a hardened circuitry 690 cannot be configured or reconfigured with different functionality. For example, a hardened circuitry 690 can include a filter having two predetermined and selectable functionalities. A third functionality cannot be added to the hardened circuitry 690, nor can one of the two functionalities be removed from the hardened circuitry 690. In contrast, a filter configured in the PL 603 can be reconfigured to add one more additional functionalities or to remove one or more functionalities. Further, a filter configured in the PL 603 can be removed entirely and replaced with another circuitry. In contrast, a hardened circuitry 690 cannot be removed from the programmable device 601 (but can be unused if desired).

In some embodiments, the nonvolatile memory 627 and/or the DRAM 628 corresponds to the external memory 350 and external memory 450 of FIGS. 3 and 4, respectively. The other circuitries 629 may correspond to a sensor or external device. In some embodiments, the peripheral interconnect 661, the inter-die interconnect circuits 664, the programmable interconnect 632, and/or the NOC 655 correspond to the interconnects and NoC 330 and interconnects and NoC 430. In some embodiments, the programmable device 601 corresponds to the SoC 302 and the SoC 402 and the PS 602 corresponds to the processor subsystem 314 or PS 316 and the processor subsystem 414 or PS 416 and the PL 603 corresponds to the FPGA 304 or the FPGA 404.

Figure 6B:
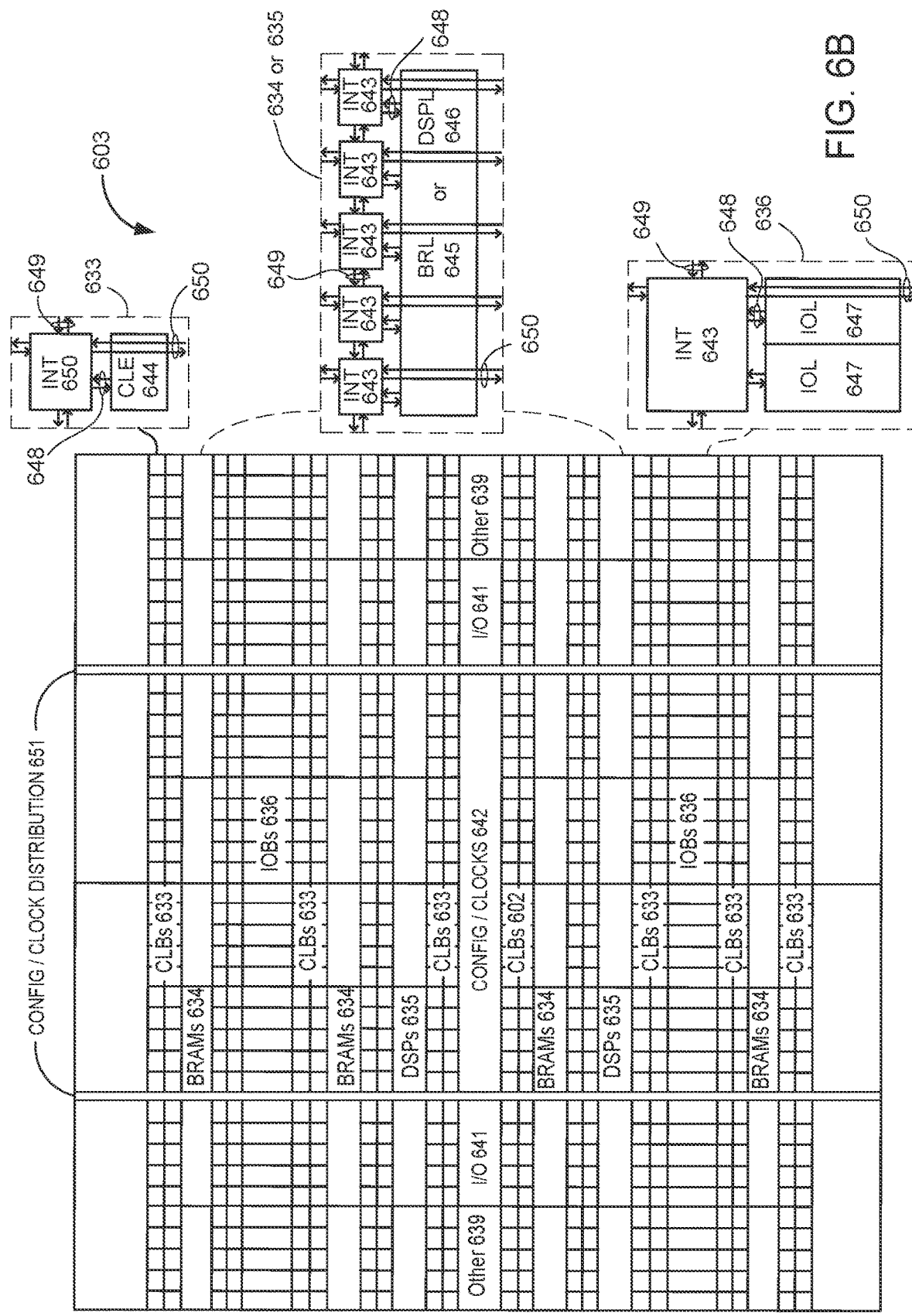
FIG. 6B illustrates a field programmable gate array (FPGA) implementation of a programmable IC according to an example.

FIG. 6B illustrates a FPGA implementation of the PL 603 according to an example. The PL 603 shown in FIG. 6B can be used in any example of the programmable devices described herein. The PL 603 includes a large number of different programmable tiles including configurable logic blocks ("CLBs") 633, random access memory blocks ("BRAMs") 634, input/output blocks ("IOBs") 636, configuration and clocking logic ("CONFIG/CLOCKS") 642, digital signal processing blocks ("DSPs") 635, specialized input/output blocks ("I/O") 641 (e.g., configuration ports and clock ports), and other programmable logic 639 such as digital clock managers, analog-to-digital converters, system monitoring logic, and so forth.

In some PLs 603, each programmable tile can include at least one programmable interconnect element ("INT") 643 having connections to input and output terminals 648 of a programmable logic element within the same tile, as shown by examples included at the top of FIG. 6B. Each programmable interconnect element 643 can also include connections to interconnect segments 649 of adjacent programmable interconnect element(s) in the same tile or other tile(s). Each programmable interconnect element 643 can also include connections to interconnect segments 650 of general routing resources between logic blocks (not shown). The general routing resources can include routing channels between logic blocks (not shown) comprising tracks of interconnect segments (e.g., interconnect segments 650) and switch blocks (not shown) for connecting interconnect segments. The interconnect segments of the general routing resources (e.g., interconnect segments 650) can span one or more logic blocks. The programmable interconnect elements 643 taken together with the general routing resources implement a programmable interconnect structure ("programmable interconnect") for the illustrated PL.

In an example implementation, a CLB 633 can include a configurable logic element ("CLE") 644 that can be programmed to implement user logic plus a single programmable interconnect element ("INT") 643. A BRAM 634 can include a BRAM logic element ("BRL") 645 in addition to one or more programmable interconnect elements. Typically, the number of interconnect elements included in a tile depends on the height of the tile. In the pictured example, a BRAM tile has the same height as five CLBs, but other numbers (e.g., four) can also be used. A DSP tile 635 can include a DSP logic element ("DSPL") 646 in addition to an appropriate number of programmable interconnect elements. An 10B 636 can include, for example, two instances of an input/output logic element ("IOL") 647 in addition to one instance of the programmable interconnect element 643.

As will be clear to those of skill in the art, the actual I/O pads connected, for example, to the I/O logic element 647 typically are not confined to the area of the input/output logic element 647.

In the pictured example, a horizontal area near the center of the die (shown in FIG. 6B) is used for configuration, clock, and other control logic. Vertical columns 651 extending from this horizontal area or column are used to distribute the clocks and configuration signals across the breadth of the PL.

Some PLs utilizing the architecture illustrated in FIG. 6B include additional logic blocks that disrupt the regular columnar structure making up a large part of the PL. The additional logic blocks can be programmable blocks and/or dedicated logic.

Note that FIG. 6B is intended to illustrate only an exemplary PL architecture. For example, the numbers of logic blocks in a row, the relative width of the rows, the number and order of rows, the types of logic blocks included in the rows, the relative sizes of the logic blocks, and the interconnect/logic implementations included at the top of FIG. 6B are purely exemplary. For example, in an actual PL more than one adjacent row of CLBs is typically included wherever the CLBs appear, to facilitate the efficient implementation of user logic, but the number of adjacent CLB rows varies with the overall size of the PL.

Figure 6C:
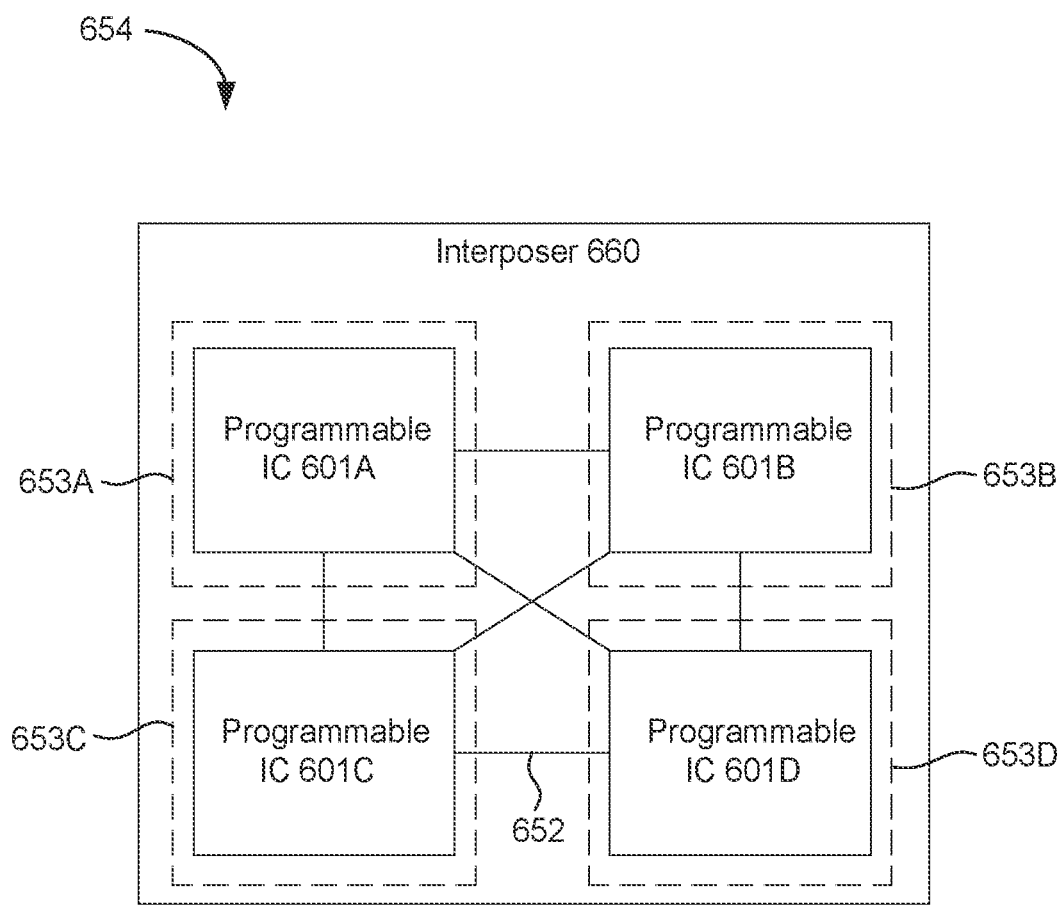
FIG. 6C is a block diagram depicting a multi-integrated circuit (IC) programmable device according to an example.

FIG. 6C is a block diagram depicting a multi-die programmable device 654 according to an example. The multi-die programmable device 654 includes a plurality of programmable devices 601, e.g., programmable devices 601A, 601B, 601C, and 601D. In an example, each programmable device 601 is an IC die disposed on an interposer 660. Each programmable device 601 comprises a super logic region (SLR) 653 of the programmable device 654, e.g., SLRs 653A, 653B, 653C, and 653D. The programmable devices 601 are interconnected through conductors on the interposer 660 (referred to as super long lines (SLLs) 52) and inter-die interconnect circuitries 664 disposed within each of the programmable devices 601.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the attached claims except where explicitly recited in a claim(s).

As will be appreciated by one skilled in the art, the embodiments disclosed herein may be embodied as a system, method or apparatus, and the like. Accordingly, aspects may take the form of an entirely hardware embodiment or a combination of hardware products or an embodiment combining hardware aspects with corresponding programming that may all generally be referred to herein as a "circuitry" or "system." Furthermore, certain aspects, such as programmable logic blocks, lookup tables (LUTs), and the like, may take the form of hardware components that can be controlled using corresponding programming.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations or programming for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and apparatuses according to various examples of the present invention. In this regard, each block in the flowchart or block diagrams may represent a circuitry, programming for such circuitry, or portion of instructions for such circuitry, which comprises one or more executable instructions for controlling or programming the circuitry to perform the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Some non-limiting examples of the technology described above includes:

Example 1: A system comprising:
an external memory circuitry configured to store data used by one or more components of the system; and
an integrated circuit (IC) configured to:
execute one or more instructions to perform data processing on a data block transferred between components of the IC;
generate a data transfer list comprising an entry including one or more of a source address field for the data block to be transferred, a destination address field for the data block, a length field of the data block, a status field for a transfer of the data block, or a check field for the data block;
before the transfer of the data block, populate the check field of the entry with a first hash value;
transfer the data block between the external memory circuitry according to the entry;
after the transfer of the data block, calculate a second hash value for the data block;
compare the second hash value with the first hash value in the check field; and
based on a determination that the second hash value is different from the first hash value, generate a flag indicating a mismatch.

Example 2: The system of Example 1, wherein the first hash value stored in the check field comprises a pre-calculated hash value for the data block or a value of zero.

Example 3: The system of Example 1, wherein the IC is configured to compare the second hash value with the first hash value in the check field based on the first hash value comprising a non-zero value.

Example 4: The system of Example 1, wherein the IC is further configured to write the second hash value to the check field based on the first hash value comprising a value of zero.

Example 5: The system of Example 1, wherein the data transfer list comprises a scatter-gather list and wherein the data is transferred between the external memory circuitry using a direct memory access (DMA) controller.

Example 6: The system of Example 1, wherein the entry further comprises a cyclic redundancy check (CRC) field configured to store a CRC value that covers the data block being transferred.

Example 7: The system of Example 6, wherein the entry further comprises a CRC enable field comprising an enable bit that indicates when to compare the CRC value in the CRC field to a calculated CRC value generated based on the data block being transferred.

Example 8: The system of Example 1, wherein the external memory circuitry is disposed on a separate chip from the IC but in data communication with the IC.

Example 9: An integrated circuit (IC) comprising:
a first memory access controller configured to:
  execute one or more instructions to perform data processing on a data block transferred between components of the IC;
  generate a data transfer list comprising an entry including one or more of a source address field for the data block to be transferred, a destination address field for the data block, a length field of the data block, a status field for a transfer of the data block, or a check field for the data block;
  before the transfer of the data block, populate the check field of the entry with a first hash value; and
  cause the data block to be transferred to an external memory circuitry according to the entry; and
a second memory access controller configured to:
  cause the data block to be read from the external memory circuitry according to the entry;
  after the transfer of the data block, calculate a second hash value for the data block;
  compare the second hash value with the first hash value in the check field; and
  based on a determination that the second hash value is different from the first hash value, generate a flag indicating a data inaccuracy in the data block.

Example 10: The integrated circuit of Example 9, wherein the first hash value stored in the check field comprises a pre-calculated hash value for the data block or a value of zero.

Example 11: The integrated circuit of Example 9, wherein the second memory access controller is configured to compare the second hash value with the first hash value in the check field based on the first hash value comprising a non-zero value.

Example 12: The integrated circuit of Example 9, wherein the second memory access controller is further configured to write the second hash value to the check field based on the first hash value comprising a value of zero.

Example 13: The integrated circuit of Example 9, wherein the data transfer list comprises a scatter-gather list and wherein the data is transferred between the external memory circuitry using the first memory access controller and the second memory access controller.

Example 14: The integrated circuit of Example 9, wherein the entry further comprises a cyclic redundancy check (CRC) field configured to store a CRC value that covers the data block being transferred.

Example 15: The integrated circuit of Example 14, wherein the entry further comprises a CRC enable field comprising an enable bit that indicates when to compare the CRC value in the CRC field to a calculated CRC value generated based on the data block being transferred.

Example 16: The integrated circuit of Example 9, wherein the external memory circuitry is disposed on a separate chip from the IC but in data communication with the IC.

Example 17: A method comprising:
executing one or more instructions to perform data processing on a data block transferred between components of an integrated circuit (IC);
generating a data transfer list comprising an entry including one or more of a source address field for the data block to be transferred, a destination address field for the data block, a length field of the data block, a status field for a transfer of the data block, or a check field for the data block;
before the transfer of the data block, populating the check field of the entry with a first hash value;
causing the data block to be transferred to an external memory circuitry according to the entry;
causing the data block to be read from the external memory circuitry according to the entry;
after the transfer of the data block, calculating a second hash value for the data block;
comparing the second hash value with the first hash value in the check field; and
based on a determination that the second hash value is different from the first hash value, generating a flag indicating a data inaccuracy in the data block.

Example 18: The method of Example 17, wherein the entry further comprises a cyclic redundancy check (CRC) field configured to store a CRC value that covers the data block being transferred.

Example 19: The method of Example 18, wherein the entry further comprises a CRC enable field comprising an enable bit that indicates when to compare the CRC value in the CRC field to a calculated CRC value generated based on the data block being transferred.

Example 20: The method of claim 17, wherein the external memory circuitry is disposed on a separate chip from the IC but in data communication with the IC.

While the foregoing is directed to specific examples, other and further examples may be devised without departing from the basic scope thereof, and the scope thereof is determined by the claims that follow.

What is claimed is:

1. An integrated circuit (IG), comprising:
a communication network;
data circuitry configured to send a write request over the communication network;
a memory controller configured to receive the write request from the communication network and write data of the write request to a memory device;
first processing circuitry configured to compute a first signature based on the data of the write request and append the first signature to the write request, before the write request is sent to the memory controller over the communication network; and
second processing circuitry configured to receive the write request having the appended first signature, from the communication network, compute a second signature based on the data of the write request, and compare the first signature appended to the write request data to the second signature.

2. The integrated circuit of claim 1, wherein the second processing circuitry is further configured to request that the data be resent when the first signature appended to the write request differs from the second signature.

3. The integrated circuit of claim 1, wherein the communication network comprises:
a packet-based network-on-chip (NoC).

4. The integrated circuit of claim 1, wherein the first processing circuitry is further configured to:
compute first signatures for all data output from the data circuitry to the communication network.

5. The integrated circuit of claim 1, wherein the memory controller comprises a portion of the second processing circuitry.

6. The integrated circuit of claim 1, wherein the memory controller is further configured to populate a data transfer list with results of the comparison of the first signature appended to the write request and the second signature, and wherein the data transfer list comprises a listing of multiple sets of data to be transferred to the memory device.

7. The integrated circuit of claim 6, wherein the memory controller is further configured to populate a header of the data transfer list with the results of the comparison.

8. The integrated circuit of claim 7, wherein the memory controller is further configured to selectively perform the comparison of the first signature appended to the data and the second signature based on a value of a signature enable field of the data transfer list.

9. The integrated circuit of claim 1, wherein:
the second processing circuitry is further configured to detect a read response from the memory controller, compute a third signature based on data of the read response, append the third signature to the read response, and forward the read response with the appended third signature to the data circuitry over the communication network; and
the first processing circuitry is further configured to detect the read response at an input of the data circuitry, compute a fourth signature based on the data of the read response, and compare the third signature appended to the read response to the fourth signature.

10. An integrated circuit, comprising:
a first communication path;
data circuitry configured to send a read request over the first communication path;
a memory controller configured to receive the read request from the first communication path, retrieve corresponding read response data from a memory device, and send the read response data to the data circuitry over the first communication path;
first processing circuitry configured to compute a first signature based on the read response data and append the first signature to the read response data, before the read response data is sent to the data circuitry over the first communication path; and
second processing circuitry configured to receive the read response data having the appended first signature, from the first communication path, compute a second signature based on the read response data, and compare the second signature to the first signature appended to the read response data.

11. The integrated circuit of claim 10, wherein:
the first communication path comprises a network-on-chip (NoC).

12. The integrated circuit of claim 10, wherein:
the second processing circuitry is further configured to initiate resending the read response data when the first signature appended to the read response data differs from the second signature.

13. The integrated circuit of claim 10, wherein the data circuitry comprises a field-programmable gate array (FPGA) configured to interface with an external sensor based on a protocol a protocol that provides packet level data protection.

14. The integrated circuit of claim 13, wherein the external sensor comprises a vehicle sensor-data circuitry.

15. The integrated circuit of claim 14, wherein the vehicle sensor comprises a camera.

16. The integrated circuit of claim 13, further comprising:
a second communication path; and
a processor subsystem configured to interface with the FPGA based on the protocol that provides the packet level data protection, and to send additional read requests to the memory controller over the second communication path;
wherein the memory controller is further configured to retrieve additional read response data from the memory device based on the additional read requests, and send the additional read response data to the processor subsystem over the second communication path;
wherein the first processing circuitry is further configured to compute signatures of the additional read response data and append the signatures to the respective additional read response data before the additional read response data is sent to the processor subsystem over the second communication path; and
wherein the second processing circuitry is further configured to receive the additional read response data having the appended signatures, from the second communication path, compute additional signatures based on the additional read response data, and compare the additional signatures to the signatures appended to the respective additional read response data.

17. A method comprising:
detecting a write request output by data circuitry of an integrated circuit device, by first processing circuitry;
computing a first signature based on data of the write request, by the first processing circuitry;
appending the first signature to the write request, by the first processing circuitry;
forwarding the write request and the appended first signature over a communication network to a memory controller of the integrated circuit device;
detecting the write request having the appended first signature at an input of the memory controller, by second processing circuitry;
computing a second signature based on the data of the write request, by the second processing circuitry; and
comparing the second signature to the first signature appended to the write request, by the second processing circuitry.

18. The method of claim 17, further comprising:
computing first signatures for all data sent from the data circuitry to the communication network and appending the first signatures to the respective data, before the data is transmitted over the communication network.

19. The method of claim 17, further comprising:
detecting a read response from the memory controller, by the second processing circuitry;
computing a third signature based on data of the read response, by the second processing circuitry;

appending the third signature to the read response, by the second processing circuitry;

forwarding the read response with the appended third signature to the data circuitry over the communication network, by the second processing circuitry;

detecting the read response at an input of the data circuitry, by the first processing circuitry;

computing a fourth signature based on the data of the read response, by the first processing circuitry; and comparing the third signature appended to the read response to the fourth signature, by the first processing circuitry.

20. The method of claim 17, further comprising, initiating resending of the write request if the first signature differs from the second signature, by the second processing circuitry.

* * * * *